(12) United States Patent
Kallahalla et al.

(10) Patent No.: US 7,203,317 B2
(45) Date of Patent: Apr. 10, 2007

(54) SYSTEM FOR ENABLING LAZY-REVOCATION THROUGH RECURSIVE KEY GENERATION

(75) Inventors: Mahesh Kallahalla, Palo Alto, CA (US); Erik Riedel, San Francisco, CA (US); Ram Swaminathan, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 859 days.

(21) Appl. No.: 09/984,927

(22) Filed: Oct. 31, 2001

(65) Prior Publication Data

US 2003/0081787 A1 May 1, 2003

(51) Int. Cl.
*H04L 9/00* (2006.01)
(52) U.S. Cl. ...................... 380/278; 380/277
(58) Field of Classification Search .............. 380/278, 380/44; 713/165
See application file for complete search history.

(56) References Cited

U.S. PATENT DOCUMENTS

| | | | | |
|---|---|---|---|---|
| 4,375,579 A | * | 3/1983 | Davida et al. ................ 380/28 |
| 4,405,829 A | * | 9/1983 | Rivest et al. ................ 380/30 |
| 4,542,452 A | * | 9/1985 | Fukai et al. ................ 700/12 |
| 4,776,011 A | * | 10/1988 | Busby ........................ 380/37 |
| 4,864,616 A | * | 9/1989 | Pond et al. ................ 713/165 |
| 5,052,040 A | * | 9/1991 | Preston et al. .............. 713/165 |
| 5,081,677 A | * | 1/1992 | Green et al. ................ 380/281 |
| 5,241,599 A | * | 8/1993 | Bellovin et al. ............ 713/171 |
| 5,261,003 A | * | 11/1993 | Matsui ........................ 380/264 |
| 5,297,207 A | * | 3/1994 | Degele ........................ 380/46 |
| 5,311,374 A | * | 5/1994 | Oh ............................... 360/32 |
| 5,495,533 A | * | 2/1996 | Linehan et al. ............ 713/155 |
| 5,499,286 A | * | 3/1996 | Kobayashi ................ 455/563 |
| 5,548,648 A | * | 8/1996 | Yorke-Smith .............. 713/193 |
| 5,584,022 A | * | 12/1996 | Kikuchi et al. ............ 707/9 |
| 5,600,767 A | * | 2/1997 | Kakiyama et al. ........ 345/629 |
| 5,619,573 A | * | 4/1997 | Brinkmeyer et al. ...... 713/170 |
| 5,644,690 A | * | 7/1997 | Yoshino et al. ............ 345/634 |
| 5,708,712 A | * | 1/1998 | Brinkmeyer et al. ...... 713/181 |
| 5,721,777 A | * | 2/1998 | Blaze ........................ 380/286 |
| 5,774,550 A | * | 6/1998 | Brinkmeyer et al. ...... 713/168 |
| 5,796,825 A | * | 8/1998 | McDonnal et al. ........ 713/165 |
| 5,870,468 A | * | 2/1999 | Harrison .................... 713/165 |
| 5,870,477 A | * | 2/1999 | Sasaki et al. .............. 713/165 |
| 5,953,419 A | * | 9/1999 | Lohstroh et al. .......... 713/165 |
| 6,002,768 A | * | 12/1999 | Albanese et al. .......... 713/175 |
| 6,011,847 A | * | 1/2000 | Follendore, III .......... 713/160 |
| 6,041,704 A | * | 3/2000 | Pauschinger .............. 101/91 |
| 6,049,612 A | * | 4/2000 | Fielder et al. .............. 380/44 |
| 6,055,316 A | * | 4/2000 | Perlman et al. ............ 380/262 |
| 6,085,323 A | * | 7/2000 | Shimizu et al. ............ 713/201 |

(Continued)

OTHER PUBLICATIONS

Matt Blaze, Key Management in an Encrypting File System, Jun. 1994, 1994 USENIX Technical Conference.*

(Continued)

*Primary Examiner*—Nasser Moazzami
*Assistant Examiner*—David Garcia Cervetti

(57) ABSTRACT

A plurality of users may have access to a file. The file is encrypted with a key. Access for a user to the file is revoked. A new key is generated from the current key of the file in response to said revocation, and the file is encrypted with the new key.

36 Claims, 6 Drawing Sheets

U.S. PATENT DOCUMENTS

| | | | | |
|---|---|---|---|---|
| 6,097,292 | A * | 8/2000 | Kelly et al. | 340/572.7 |
| 6,128,551 | A * | 10/2000 | Davis et al. | 700/236 |
| 6,148,292 | A * | 11/2000 | Reisinger et al. | 705/30 |
| 6,178,508 | B1 * | 1/2001 | Kaufman | 713/183 |
| 6,182,222 | B1 * | 1/2001 | Oparaji | 726/17 |
| 6,226,618 | B1 * | 5/2001 | Downs et al. | 705/1 |
| 6,249,866 | B1 * | 6/2001 | Brundrett et al. | 713/165 |
| 6,256,733 | B1 * | 7/2001 | Thakkar et al. | 713/156 |
| 6,272,674 | B1 * | 8/2001 | Holiday, Jr. | 717/174 |
| 6,324,581 | B1 * | 11/2001 | Xu et al. | 709/229 |
| 6,363,149 | B1 * | 3/2002 | Candelore | 380/45 |
| 6,389,420 | B1 * | 5/2002 | Vahalia et al. | 707/8 |
| 6,397,261 | B1 * | 5/2002 | Eldridge et al. | 713/171 |
| 6,405,315 | B1 * | 6/2002 | Burns et al. | 713/190 |
| 6,433,833 | B1 * | 8/2002 | Greenwood et al. | 348/584 |
| 6,438,529 | B1 * | 8/2002 | Thiel | 705/62 |
| 6,453,354 | B1 * | 9/2002 | Jiang et al. | 709/229 |
| 6,453,416 | B1 * | 9/2002 | Epstein | 713/170 |
| 6,480,101 | B1 * | 11/2002 | Kelly et al. | 340/10.2 |
| 6,519,594 | B1 * | 2/2003 | Li | 707/10 |
| 6,523,014 | B1 * | 2/2003 | Pauschinger | 705/410 |
| 6,577,735 | B1 * | 6/2003 | Bharat | 380/286 |
| 6,640,303 | B1 * | 10/2003 | Vu | 713/171 |
| 6,684,331 | B1 * | 1/2004 | Srivastava | 713/163 |
| 6,711,594 | B2 * | 3/2004 | Yano et al. | 707/204 |
| 6,727,802 | B2 * | 4/2004 | Kelly et al. | 340/10.1 |
| 6,775,281 | B1 * | 8/2004 | Brown | 370/392 |
| 6,930,917 | B2 * | 8/2005 | Novac et al. | 365/185.05 |
| 6,938,020 | B2 * | 8/2005 | Nakayama | 705/67 |
| 7,096,356 | B1 * | 8/2006 | Chen et al. | 713/163 |
| 2002/0019935 | A1 * | 2/2002 | Andrew et al. | 713/165 |
| 2002/0038421 | A1 * | 3/2002 | Hamada | 713/171 |
| 2002/0138504 | A1 * | 9/2002 | Yano et al. | 707/204 |
| 2002/0138722 | A1 * | 9/2002 | Douceur et al. | 713/153 |
| 2002/0184504 | A1 * | 12/2002 | Hughes | 713/177 |
| 2003/0026422 | A1 * | 2/2003 | Gerheim et al. | 380/210 |
| 2003/0210790 | A1 * | 11/2003 | Riedel et al. | 380/277 |
| 2004/0151310 | A1 * | 8/2004 | Fu et al. | 380/44 |

OTHER PUBLICATIONS

M. Blaze. "A Cryptographic File System for Unix." Proceedings of the First ACM Conference on Computer and Communications Security, Fairfax, VA, Nov. 1993.*

FU, Kevin E, "Group Sharing and Random Access in Cryptographic Storage File Systems", Jun. 1999, p. 3-11, 13-45, 47-63, 65-69, 71-75, 77, 79-83, 85.

* cited by examiner

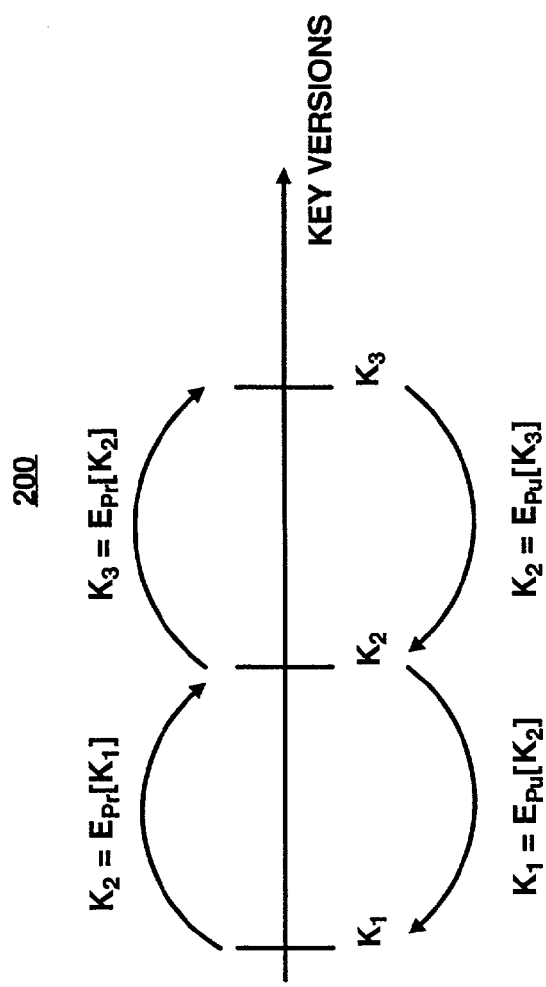
FIG. 2
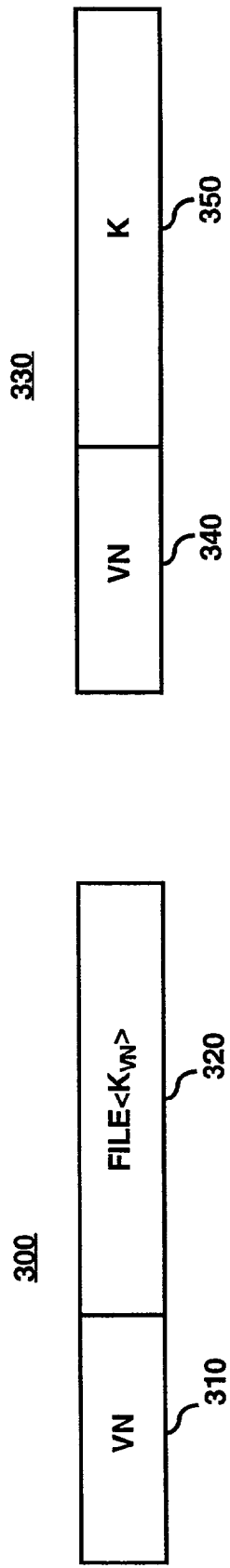
FIG. 3A
FIG. 3B

SYSTEM FOR ENABLING LAZY-REVOCATION THROUGH RECURSIVE KEY GENERATION

RELATED APPLICATIONS

The following commonly assigned applications, filed concurrently, may contain some common disclosure and may relate to the present invention are hereby incorporated by reference:

U.S. patent application Ser. No. 09/984,928 entitled "SYSTEM FOR OPTIMIZED KEY MANAGEMENT WITH FILE GROUPS";

U.S. patent application Ser. No. 09/984,926 entitled "SYSTEM FOR ENSURING DATA PRIVACY AND USER DIFFERENTIATION IN A DISTRIBUTED FILE SYSTEM"; and U.S. patent application Ser. No. 09/984,936 entitled "SYSTEM FOR ENCRYPTED FILE STORAGE OPTIMIZATION VIA DIFFERENTIATED KEY SIZES".

FIELD OF THE INVENTION

This invention relates generally to cryptographic key management. In particular, the invention relates to enabling lazy-revocation through recursive key generation in a cryptographic file system.

DESCRIPTION OF THE RELATED ART

In a conventional cryptographic file system, the data (or files) are stored encrypted. This is a convenient feature especially if an owner of the files cannot trust the administrator of the server to provide adequate security measures to ensure data privacy. To make the conventional cryptographic file system more user-friendly, users typically try to minimize the number of cryptographic keys used to encrypt the files. Otherwise, the number of cryptographic keys may be equal to the number of files that the owner/user may have on the cryptographic keys, which may make managing the cryptographic keys burdensome, and thereby making the cryptographic file system less user-friendly.

In one aspect, users share files in a cryptographic file system by having a copy of the encrypted file and an associated decryption key. In this manner, a user may utilize the associated decryption key to decrypt the received encrypted file for access to the file. However, in some instances, an owner of a file may attempt to prevent a previously authorized user from future access to the file, i.e., revoke a user.

One method for revoking a user by an owner of the file is to re-encrypt all the files of the owner with a new cryptographic key. However, re-encrypting all the files is a time-consuming and burdensome task, especially if the owner has encrypted a number of files with the same cryptographic key.

Another solution for revoking a user is described in "Group Sharing and Random Access in Cryptographic Storage File Systems," Master's Thesis, Department of EECS, MIT June 1999, written by Kevin Fu, which is hereby incorporated by reference in its entirety. This solution proposes a technique called lazy revocation where files are to be re-encrypted with a different key only when the file is updated. Accordingly, a revoked user is unable to view any updates to the file. In particular, Fu proposes utilizing a 'lock-box'. The cryptographic key used to encrypt a file is stored in the lockbox. The lockbox is also encrypted with another cryptographic key that is stored in a trusted group server. In the event of a user revocation, all the lockboxes that the revoked user had access to are marked as 'dirty' and any subsequent updates to any dirty file causes that file to be re-encrypted.

Although Fu's design is an adequate solution, the design may have some drawbacks as applied to different types of cryptographic file system architectures. For instance, in a cryptographic system where the file server cannot be trusted (or required) to perform user authentication, Fu's proposal may generate a substantial amount of work for a file owner. In particular, in Fu's proposal, the file server and/or group server are guaranteed that a revoked user (or unauthorized user) cannot see the contents of an encrypted file. In order to meet his constraint in an untrusted server environment, Fu's design can provide security if the design is extended such the owner changes the group key (in the group server) and re-encrypts all the lockboxes at the time of revocation. Accordingly, this makes revocation expensive in terms of user time and computational resources, especially if the revoked user had access to a large number of files. In essence, this constraint allows lockboxes to perform lazy-re-encryption of the files, but requires immediate re-encryption of the lockboxes as opposed to a more ideal scenario where the revocation process does not interrupt the file owner. Further, since there are now two encryption keys for this file—the current and the former key—additional key storage is required. Further, when a second revocation occurs, the current key becomes the former key and any files protected with the former key must be aggressively re-encrypted.

In general, other conventional secure systems that provide revocation, such as in UNIX and WINDOWS NT, rely on the server checking for user's group membership before granting access. This particular trait requires the servers to store (or cache) information regarding users, which places a high trust requirement on the servers and requires all the servers to maintain this authentication information in a secure and consistent manner.

SUMMARY OF THE INVENTION

In accordance with the principles of the present invention, one aspect of the invention pertains to a method of enabling lazy-revocation in a cryptographic file system. The method includes revoking access of a user or a plurality of users to a file and generating a new version of a key based on a current version of the key. The method also includes encrypting the file with the new version of the key in response to an update of the file.

Another aspect of the present invention relates to a method of managing files in a file system. The method includes revoking access of a user from a plurality of user to a file and generating a new key from a current key of the file in response to the revocation. The method also includes encrypting the file with the new key.

Yet another aspect of the present invention pertains to a method of accessing files. The method includes determining a version of a file and determining a version of a key. The method further includes accessing the file in response to the version of the file and the version of the key matching.

Yet another aspect of the present invention relates to a method for accessing files. The method includes determining a version of a file and determining a version of a key. The method also includes recursively generating a previous version of the key from the key until the version of the key matches the version of the file.

Yet another aspect of the present invention pertains to a system for managing files. The system includes a file system configured to store files and provide access to the files, a user station, and a security module configured to be executed on the user station. The security module is configured to revoke access of a user from a plurality of users to a file and is also configured to generate a new key from a current key of the file stored on the file system in response to the revocation. The security module is further configured to encrypt the file with the new key.

Yet another aspect of the present invention relates to a system for accessing files. The system includes a memory, at least one processor, and a security module residing in the memory and executed by at least one processor. The security module is configured to determine a version of a file and is also configured to determine a version of a key. The security module is further configured to access the file in response to the version of the file and the version of the key matching.

Yet another aspect of the present invention appertains to an apparatus for accessing files. The apparatus includes means for determining a version of a file and means for determining a version of a key. The apparatus also includes means for recursively generating a previous version of the key from the key until the version of the key matches the version of the file.

Yet another aspect of the present invention concerns an apparatus for managing files in a file system. The apparatus includes means for revoking access of a user from a plurality of users to a file and means for generating a new key from a current key of the file in response to the revocation. The apparatus also includes means for encrypting the file with the new key.

BRIEF DESCRIPTION OF THE DRAWINGS

Various features and aspects of the present invention can be more fully appreciated as the same become better understood with reference to the following detailed description of the present invention when considered in connection with the accompanying drawings, in which:

FIG. 2 illustrates an exemplary diagram of a recursive key generation process in accordance with an embodiment of the present invention;

FIG. 3A illustrates a diagram of an exemplary file structure utilized by an embodiment of the present invention;

FIG. 3B illustrates a diagram of an exemplary cryptographic key structure utilized by an embodiment of the present invention;

DETAILED DESCRIPTION OF A PREFERRED EMBODIMENT

Figure 1:
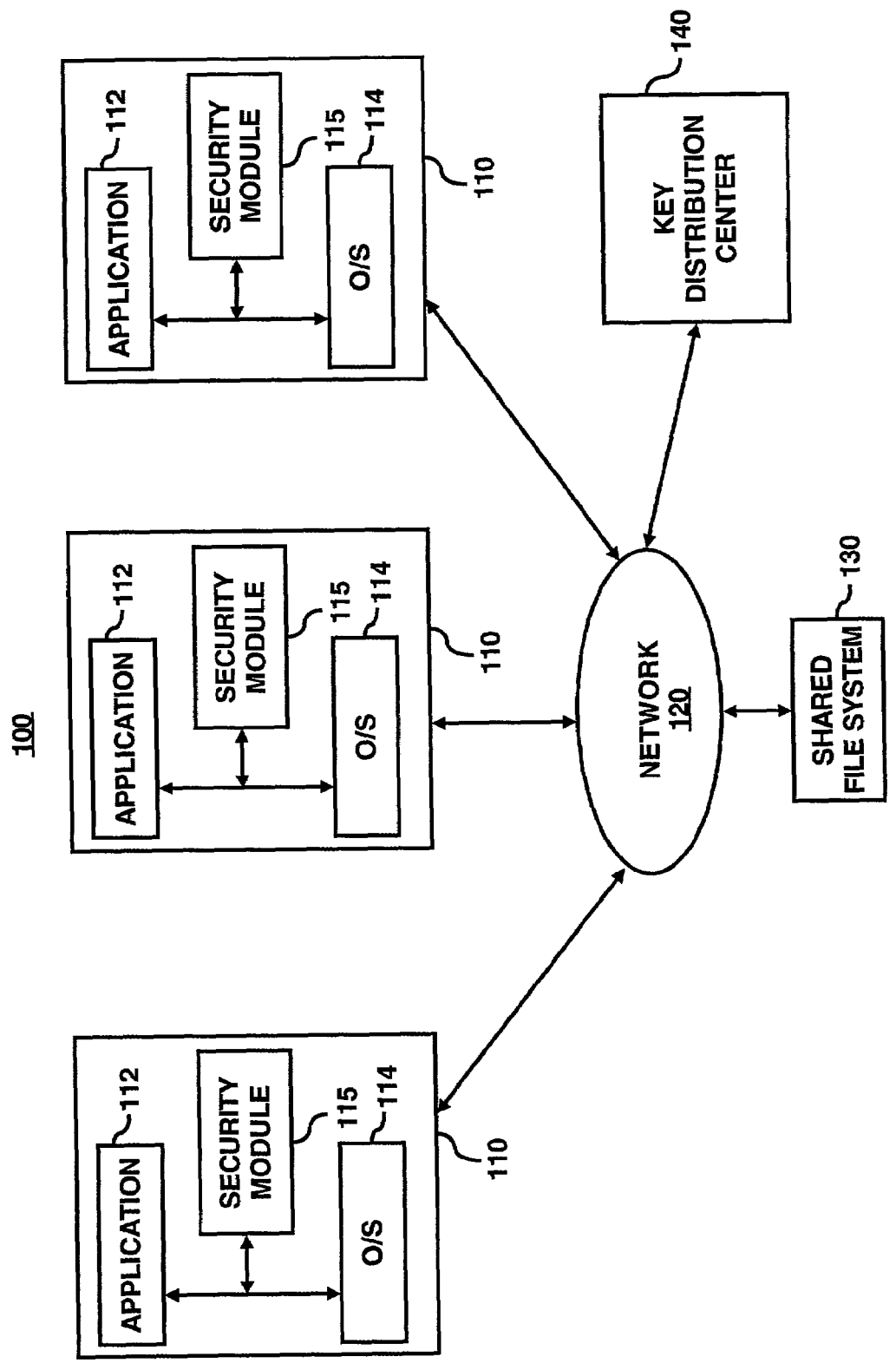
FIG. 1 illustrates block diagram of a system utilizing an embodiment of a security module in accordance with the principles of the present invention.

For simplicity and illustrative purposes, the principles of the present invention are described by referring mainly to an exemplary embodiment of a security module. However, one of ordinary skill in the art would readily recognize that the same principles are equally applicable to, and can be implemented in, all types of systems requiring cryptographic key management, and that any such variation does not depart from the true spirit and scope of the present invention. Moreover, in the following detailed description, references are made to the accompanying drawings, which illustrate specific embodiments in which the present invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In accordance with the principles of the present invention, a cryptographic file system may be configured to provide the capability of performing lazy-revocation without increasing the number of cryptographic keys in the cryptographic file system. In particular, an owner of encrypted files may revoke a user access to a selected encrypted file(s) by generating a new version of a cryptographic key to the selected file utilizing a security module configured to generate the new version of a cryptographic key from a current version of the cryptographic key. The security module may be configured to generate the new cryptographic key by encrypting the current cryptographic key with the owner's asymmetric private key: $K_{i+1}=E_{pr}[K_i]$, where the file owner may only generate the subsequent versions of the cryptographic keys. The new version of the cryptographic key may be used to re-encrypt the selected file. Subsequently, the new version of the cryptographic key may be distributed to authorized users.

In another aspect of the present invention, since subsequent versions of the cryptographic keys are generated based on a previous version of the cryptographic key, an authorized user may utilize the security module to access previous versions of the encrypted file while holding the current version of the cryptographic key. In particular, an owner may have multiple versions of a selected encrypted file. Each version of the selected encrypted file has a corresponding cryptographic key. An owner may revoke access privileges to a user to subsequent later versions of the selected encrypted file by generating a new cryptographic key according to the method described herein above and in further detail below based on the current cryptographic key.

However, an authorized user may access encrypted files that have been encrypted with the current cryptographic key or earlier. Since each version of the cryptographic keys is generated by utilizing the owner's asymmetric private key on the current version of the key, the authorized user may use the public key of the owner to generate a previous version of the cryptographic key based on the relationship of $K_{i-1}=E_{pu}[K_i]$, where the asymmetric public key is related to the owner's asymmetric private key. Accordingly, by utilizing a recursive key generation technique, an owner may revoke a user while still permitting authorized users access to previous versions of the file by generating previous versions of the current cryptographic key. Moreover, by enabling lazy-revocation though recursive key generation, the number of keys in the cryptographic system remains minimal since previous versions of cryptographic keys may be generated by the authorized user while still barring access to unauthorized users.

In yet another aspect, the present invention may be utilized to optimize key management for file encryption groups. A file encryption group may be a group of files encrypted with the same cryptographic key. For example, a file encryption group may contain files A, B, and C encrypted with a current cryptographic key. An authorized reader re-encrypts file A with a new version of the current cryptographic key as described herein above and more fully herein below. The new version of the key becomes the current version of the cryptographic key. Subsequently, an authorized user may access file A using the current cryptographic key while generating previous versions of the cryptographic key for file B and C. Thus, only one cryptographic key needs to be stored for the file encryption group, thereby optimizing key management for the file encryption group.

FIG. 1 illustrates block diagram of a system 100 where an embodiment of the present invention may be practiced. As shown in FIG. 1, the system 100 includes user stations 110, a network 120, and a shared file system 130.

The user stations 110 of the system 100 may be configured to provide access to computer software applications and/or data. The user stations 110 may be implemented by a personal computer, a laptop computer, a workstation, a portable wireless device, and other similar computing devices.

Each user station 110 may include an application 112, an operating system 114 and a security module 115. Although, for illustrative purposes only, FIG. 1 illustrates an exemplary embodiment of the architecture for the user station 110, it should be readily apparent to those of ordinary skill in the art that FIG. 1 represents a generalized schematic illustration of the user station 110 and that other components may be added or existing components may be removed without departing from the spirit or scope of the present invention.

The application 112 may be software computer program that is executed on the user station 110. The application 112 may be a word processing program, a spreadsheet program, a shell program, or any other type of program that generates files to be stored in the shared file system 130. The application 112 may be interfaced with the operating system 114 through an application program interface (API, not shown). The operating system 114 may be configured to manage the software applications, data and respective hardware components (e.g., displays, disk drives, etc.) of the user station 110. The operating system 114 may be implemented by MICROSOFT WINDOWS family of operating systems, UNIX, HEWLETT-PACKARD HP-UX, LINUX, RIM OS, and other similar operating systems.

The operating system 114 of the user station 110 may be configured to interface with the security module 115. The security module 115 may be configured to provide the capability of recursively generating keys to enable lazy revocation in an untrusted server environment. In particular, a file owner may utilize the security module 115 to generate the next version of key based on the current key version and the file owner's asymmetric private key. Authorized users may use the security module 115 to access the encrypted files. Moreover, authorized user may also use the security module 115 to generate previous versions of the key to access corresponding versions of the file based on the current key and the asymmetric public key of the owner. The security module 115 may be implemented as a software program, a utility, a subroutine, or other similar programming entity. In this respect, the security module 115 may be implemented using software languages such as C, C++, JAVA, etc. Alternatively, the security module 115 may be implemented as an electronic device utilizing an application specific integrated circuit, discrete components, solid-state components or combination thereof.

The user stations 110 may be further configured to interface with the network 120 through a respective network interface (not shown). The network 120 may be configured to provide a communication channel between each user station 110 and the shared file system 130. The network 120 may be a wired network (e.g., PSTN, fiber optic, etc.), wireless network (e.g., text messaging, Wireless Application Protocol, etc.), or combination thereof. The network 120 may be further configured to support network protocols such as Transmission Control Protocol/Internet Protocol, IEEE 802.5, Asynchronous Transfer Mode, Cellular Digital Packet Data, MOBITEX, IEEE 801.11b, and other similar network protocols.

The shared file system 130 may be configured to provide storage of data and/or software applications for the system 100. The shared file system 130 may be a network accessible disk drive and/or array of disks.

Optionally, the system 100 may include a key distribution center 140. The key distribution center 140 may be configured to provide a secure method of transferring encryption/decryption keys within the system 100.

In accordance with one aspect of the present invention, an owner may revoke access to a file for a user by utilizing the security module 115. The security module 115 may be configured to generate a new cryptographic key based on the current cryptographic key and an asymmetric private cryptographic key of the file owner, i.e., $K_{i+1}=E_{pr}[K_i]$. The security module 115 may then utilize the new version of the cryptographic key and the file to encrypt the file for storage on the shared file system 130. The security module 115 may be also configured to attach a header file (or metadata) to the encrypted file. The header file may provide the capability for other authorized users to determine which version of the cryptographic key was used to encrypt the file.

In accordance with another aspect of the present invention, an authorized user may utilize the security module 115 to decrypt the encrypted file with a complementary cryptographic key. Moreover, the security module 115 may be configured to determine which version of the cryptographic key was utilized to encrypt a selected file. If security module 115 determines that the selected file is encrypted with a previous version of the cryptographic key, the security module 115 may be further configured to generate the previous version of the cryptographic key based on the current key the authorized user holds and the asymmetric public key of the owner, i.e., $K_{i-1}=E_{pu}[K_i]$. Accordingly, an owner may revoke a user from future versions of a selected file, while still permitting access by authorized users to the previous versions of the selected file. Thus, lazy-revocation is enabled in an environment where the server may not be trusted.

In yet another aspect of the present invention, the current version of the cryptographic key used in the encryption and decryption of the files may be a symmetric key or an asymmetric read/write key as disclosed in concurrently filed U.S. patent application Ser. No. 09/984,926 entitled "SYSTEM FOR ENSURING DATA PRIVACY AND USER DIFFERENTIATION IN A DISTRIBUTED FILE SYSTEM", which is hereby incorporated by reference in its entirety.

In particular, when using a symmetric cryptographic key, the new and previous version of the symmetric cryptographic key may be generated by applying an asymmetric private/public key pair, respectively. The asymmetric private/public key pair may be generated using asymmetric crypto-algorithms such as Rivest-Shamir-Adelman (RSA), El Gamal or other similar algorithms. When using asymmetric read/write key pairs as the current cryptographic key, an El Gamal crypto-algorithm may be utilize to generate the new and previous versions of the current cryptographic keys as described herein below with FIGS. 4 and 5.

In yet another aspect, the present invention may have utility where groups of file are encrypted with the same key as disclosed in concurrently filed U.S. patent application Ser. No. 09/984,928, entitled "SYSTEM FOR OPTIMIZED KEY MANAGEMENT WITH FILE GROUPS", which is hereby incorporated by reference in its entirety.

In particular, lazy-revocation may be implemented where file encryption groups are used to access files. File encryption groups are group of files that have been encrypted with the same cryptographic key. For instance, a file A of a file encryption group may be re-encrypted with a newer version of the cryptographic key, where the newer version of the cryptographic key becomes the current cryptographic key for the file encryption group. Files B and C of the file encryption group may remain encrypted with the previous version of the cryptographic key. Subsequently, an authorized user may access file A using the current cryptographic key while generating previous versions of the cryptographic key for file B and C. Thus, only one cryptographic key needs to be stored for the file encryption group. Accordingly, key management for groups of encrypted file may be improved by maintaining a single cryptographic key.

FIG. 2 illustrates an exemplary diagram 200 of a recursive key generation process in accordance with an embodiment of the present invention. As shown in FIG. 2, the security module 115 may be utilized to generate cryptographic key, $K_2$, from $K_1$ by the relationship $K_2=E_{Pr}[K_1]$. In particular, the security module 115 may be configured to generate $K_2$ from the private key of the file owner. Similarly, cryptographic key, $K_3$, may be generated by the recursive relationship of $K_3=E_{Pr}[K_2]$.

Moreover, an authorized user may generate previous versions of the cryptographic key, $K_3$ by utilizing the relationship $K_2=E_{Pu}[K_3]$. Cryptographic key $K_1$ may be generated from cryptographic key $K_2$ by the relationship $K_1=E_{Pu}[K_2]$ or by the transitive relationship from $K_3$, $K_1=E_{Pu}[E_{Pu}[K_3]]$.

FIG. 3A illustrates a diagram of an exemplary file data structure 300 utilized by an embodiment of the present invention. As shown in FIG. 3A, the file data structure 300 includes a header portion (or metadata) 310 with a encrypted file 320. The security module 115 may be configured to attach the header portion 310 onto the encrypted file 320 during the encryption process. The header portion 310 may contain information related to the version of the cryptographic key used in the encryption. The header portion 310 may be implemented using a variety of methods such as a bit map.

FIG. 3B illustrates a diagram of an exemplary key data structure 330 utilized by an embodiment of the present invention. As shown in FIG. 3B, the key data structure 330 may include a header portion (or metadata) 340 with a cryptographic key 350, where the cryptographic key 350 may be used to encrypt a selected file.

The header portion 340 may be configured to provide information related to the version of the cryptographic key and the file owner. The header portion 340 may be implemented using a variety of methods such as a bit map, bit fields, etc. The security module 115 may be configured to initialize the header portion 340 to a value of an initial value (e.g., 0 or 1) during the generation of the cryptographic key. For each time a new version of the current cryptographic key is generated, the security module 115 may be configured to increment the value in the header portion 340 by one. The security module 115 may be further configured to add information related to the owner of the file in the header portion 340 during the generation of the cryptographic key.

Figure 4:
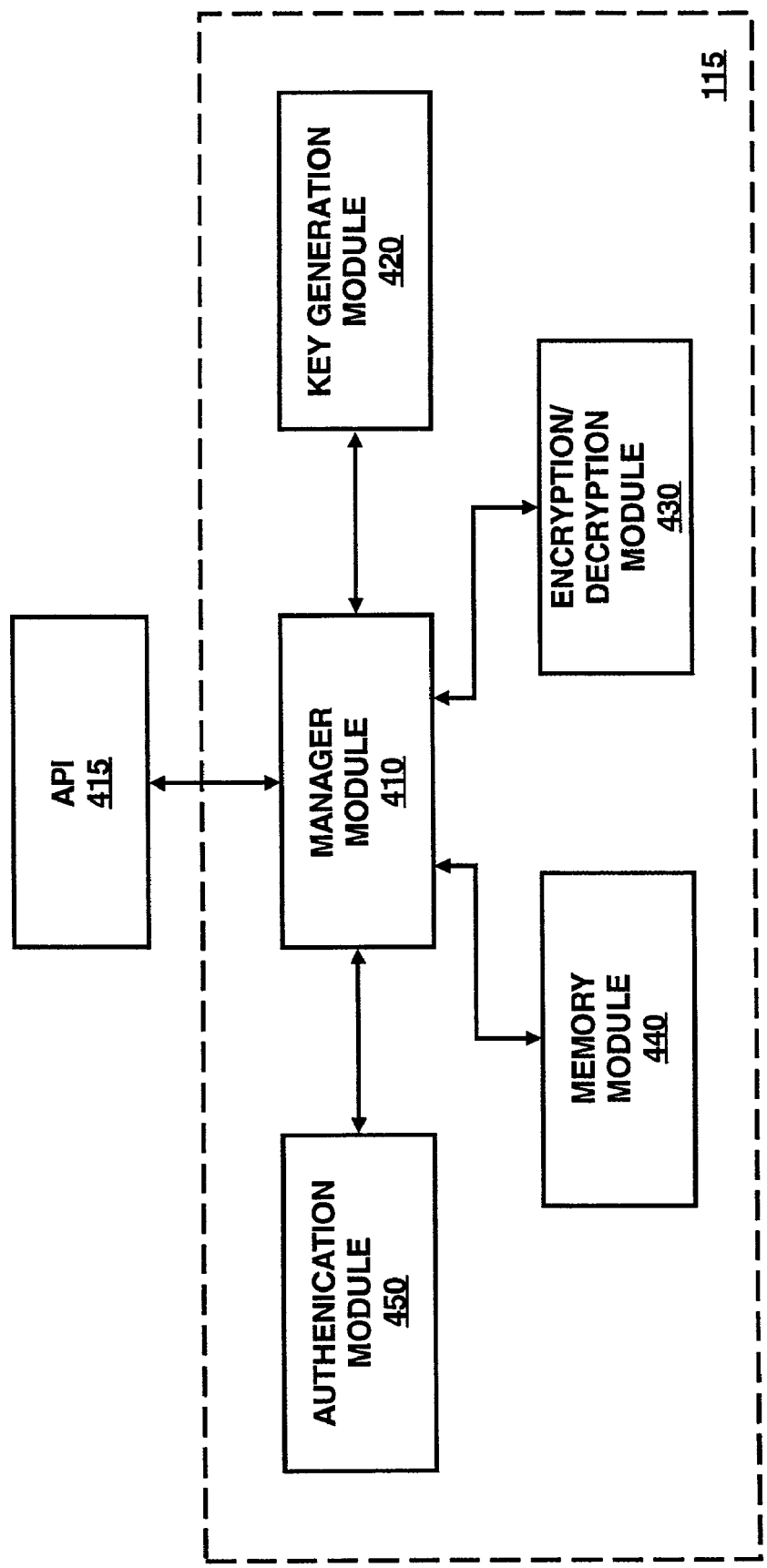
FIG. 4 illustrates a diagram of an exemplary architecture of the security module shown in FIG. 1 in accordance with an embodiment of the present invention.

FIG. 4 illustrates a diagram of an exemplary architecture of the security module 115 shown in FIG. 1 in accordance with an embodiment of the present invention. Although, for illustrative purposes only, FIG. 4 illustrates an exemplary embodiment of the security module 115, it should be readily apparent to those of ordinary skill in the art that FIG. 4 represents a generalized schematic illustration of the security module 115 and that other components may be added or existing components may be removed without departing from the spirit or scope of the present invention. Moreover, since FIG. 4 illustrates an exemplary embodiment of the security module 115, where the security module 115 may be implemented as a hardware embodiment, a software embodiment, and/or combination thereof and such embodiments are well within the scope and spirit of the present invention.

As shown in FIG. 4, the security module 115 includes a manager module 410, an application program interface (API) 415, a key generation module 420, and an encryption/decryption module 430. The manager module 410 may be configured to provide management functions for the security module 115. For example, the manager module 410 may be configured to determine whether to generate a previous version of a cryptographic key. The manager module 410 may be also configured to initiate the generation of a subsequent (or next) version of key based on the current version of a cryptographic key and an asymmetric private key of the file owner.

The manager module 410 may be further configured to interface with the key generation module 420. The key generation module 420 may be configured to recursively generate future versions of a current cryptographic key and/or recursively generate previous versions of the current cryptographic key. In one aspect of the present invention, the key generation module 420 may be configured to generate the versions of the cryptographic keys based on an asymmetric private/public key pair of the file owner, where the cryptographic key is a symmetric key. The key generation module 420 may create randomly-generated keys for use in a symmetric crypto-algorithm such as DES, 3DES, Rijndael, etc.

In another aspect of the present invention, the key generation module 420 may be configured to generate new and previous versions of an asymmetric read/write cryptographic keys based on an asymmetric crypto-algorithm. In particular, the El Gamal cryptosystem is used to generate the new and previous versions of the current asymmetric read/write key pair. When a file owner creates a file, the file owner may generate a large random prime number, p: a number, g, called the generator on $Z^*_p$ (the multiplicative group mod p); and a current cryptographic key version, $K_i$ based on the El Gamal crypto-algorithm. The random prime number, p, may be distributed to all the readers and writers of the file and the number, g, may be distributed to the only the writers of the file.

A user, as part of the reader group, may utilize the cryptographic key generated by the El Gamal cryptosystem in conjunction with the number, g, as a cryptographic read key, i.e., ($K_i$, g). A user, as part of the writer group, may utilize the cryptographic key, the random prime number, p, and the number, g, as a cryptographic write key, i.e., ($K_i$, g, p).

The manager module 410 may be further configured to interface with the encryption/decryption module 430. The encryption/decryption module 430 may be configured to provide encryption and decryption services to the security module 115. In particular, the encryption/decryption module 430 may encrypt files with a current version of a cryptographic key. The encryption/decryption module 430 may also decode the encrypted files with a complementary cryptographic key for an authorized user to access the file.

The manager module 410 may be further configured to interface with an optional memory module 440. The memory module 440 may be configured to provide storage for the cryptographic keys. In one contemplated embodiment, an owner of a file may temporarily store the cryptographic keys used in the system 100 (shown in FIG. 1) in the memory module 440. The memory module 440 may be implemented using a floppy disk drive, a memory stick or other similar memory devices, which the medium may be stored in a secure location (e.g., a vault or locked drawer).

The manager module may be yet further configured to interface with an optional authentication module 450. The authentication module 440 may be configured to provide authentication services for the security module 115. In particular, the authentication module 340 may be configured to query the key distribution center 140 for authentication of a user requesting access to a selected file.

Figure 5:
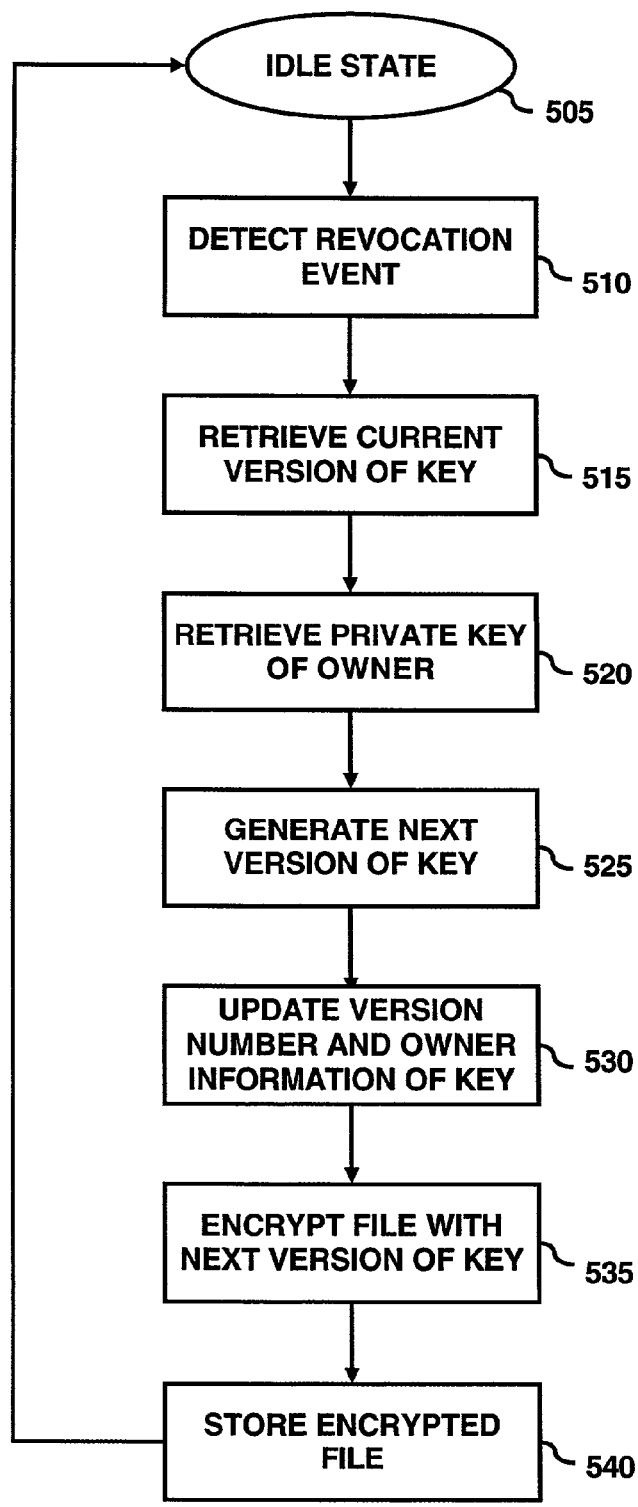
FIG. 5 illustrates an exemplary flow diagram for an operational mode of the security module shown in FIGS. 1 and 4 in accordance with an embodiment of the present invention.

FIG. 5 illustrates an exemplary flow diagram 500 for an operational mode of the security module shown in FIGS. 1 and 3 in accordance with an embodiment of the present invention. Although, for illustrative purposes only, FIG. 5 illustrates a flow diagram for the security module 115 with the following steps, it should be readily apparent to those of ordinary skill in the art that FIG. 5 represents a generalized illustration of an embodiment of the security module 115 and that other steps may be added or existing steps may be removed without departing from the spirit or scope of the present invention.

As shown in FIG. 5, in step 505, the manager module 410 of the security module 115 may be configured to be in an idle state, monitoring the API interface 415. In response to a detecting a revocation event from the API interface 415, the manager module 410 may be configured to retrieve the current version of a cryptographic key of a file owner, in step 515. The manager module 410 may initiate this operation in response to a file owner revoking file access to a user which is detected in step 510. The current cryptographic key may be supplied by the file owner through a user interface of the user station 110 (shown in FIG. 1). Alternatively, the file owner may have stored the current cryptographic key in the memory module 440 of the security module 115 or the file owner may have retrieved the current version of the cryptographic key from the key distribution center 140.

In step 520, the manager module 410 may be configured to retrieve a private cryptographic key (e.g., $E_{Pr}$ shown in FIG. 2) of the file owner. The private cryptographic key may be part of an asymmetric cryptographic private/public key pair. The asymmetric cryptographic private/public key may be utilize to generate the new and previous version of the current cryptographic key, respectively.

In step 525, the manager module 410 may be configured to pass the current cryptographic key and the asymmetric cryptographic private key of the file owner to the key generation module 420. The key generation module 420 may be configured to generate a next version of the current cryptographic key represented by the relationship of $K_{i+1} = E_{Pr}[K_i]$.

In step 530, the manager module 410 may be configured to retrieve the value of the current version of the cryptographic key from the header portion 340. The manager module 410 may increment the retrieved value and place the updated value into the header portion 340 of the key data structure of the next version of the current cryptographic key.

In step 535, the manager module 410 may be configured to pass the subsequent or next version of the current cryptographic key and the selected file(s) (or a pointer(s) to the selected file(s)) to the encryption/decryption module 430. The encryption/decryption module 430 may be configured to encrypt the selected files(s) with the next version of the cryptographic key.

In step 540, the manager module 410 may be configured to forward the encrypted file and the header portion to the operating system 114 for storage on the shared file system 130. Subsequently, the manager module 410 may be configured to return to an idle state.

Figure 6:
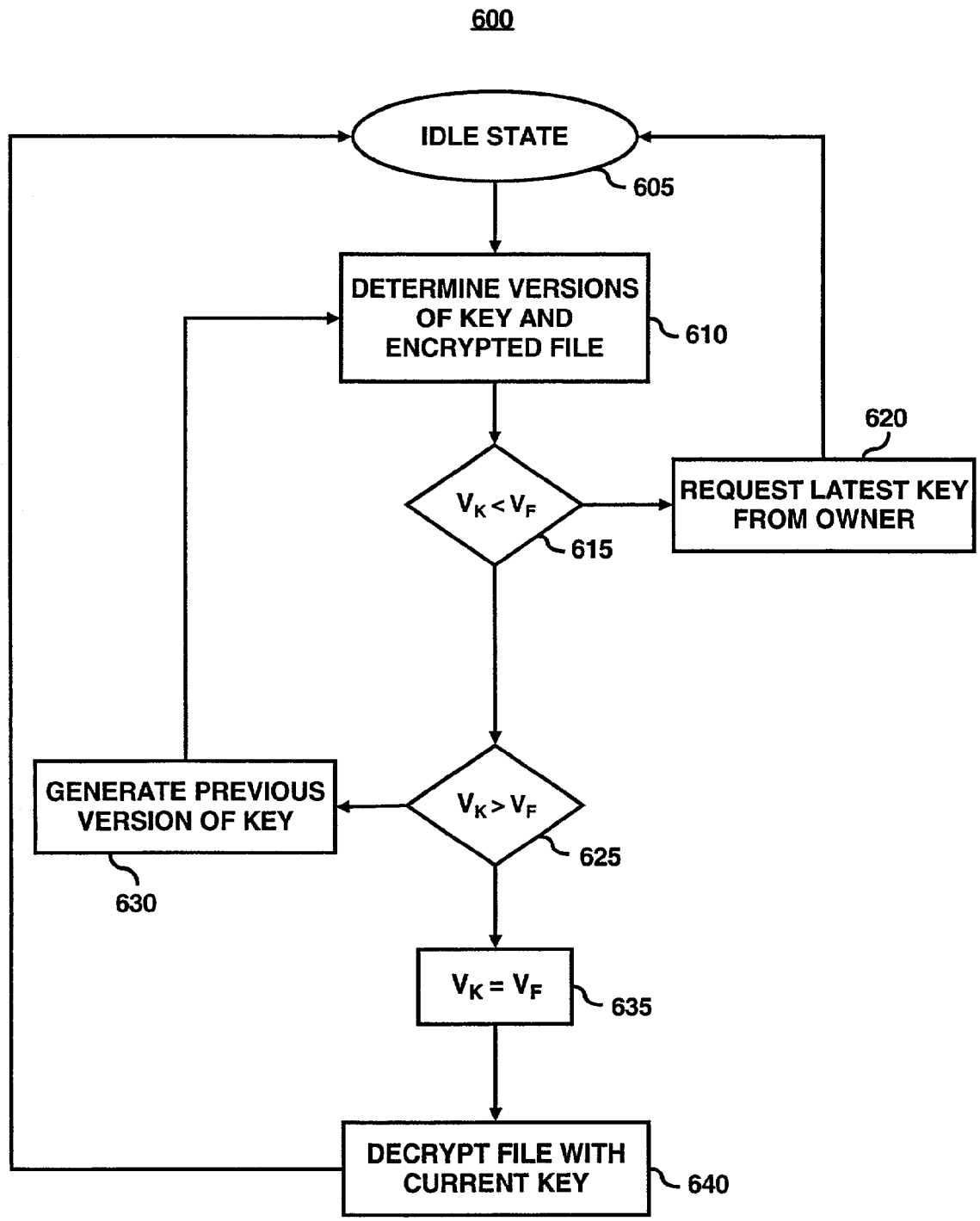
FIG. 6 illustrates an exemplary flow diagram for a second operational mode of the security module shown in FIGS. 1 and 3 in accordance with an embodiment of the present invention.

FIG. 6 illustrates an exemplary flow diagram 600 for a second operational mode of the security module 115 shown in FIGS. 1 and 4 in accordance with an embodiment of the present invention. Although, for illustrative purposes only, FIG. 6 illustrates a flow diagram for the security module 115 with the following steps, it should be readily apparent to those of ordinary skill in the art that FIG. 6 represents a generalized illustration of an embodiment of the security module 115 and that other steps may be added or existing steps may be removed without departing from the spirit or scope of the present invention.

As shown in FIG. 6, in step 605, the manager module 410 of the security module 115 may be configured to be an idle state. In step 610, the manager module 410 may be configured to determine the version of the cryptographic key used to encrypt a selected file. In particular, the manager module 410 may compare the metadata of the cryptographic key that an authorized user possess with the metadata of the selected file, where the respective metadata contains the version numbers of the respective cryptographic keys. The manager module 410 may be configured to initiate this operation in response to an authorized user's action for access to the selected file.

In step 615, the manager module 410 may be configured to determine that the version of the selected file is later than the version of the cryptographic key that the authorized user possesses, the manager module 410 may be configured to inform the authorized user to request the latest version of the cryptographic key from the file owner of the selected file in step 620 by determining the file owner from the header portion of the cryptographic key. Alternatively, the manager module 410 may be configured to utilize the optional authentication module 450 to request the latest version of the cryptographic key from the key distribution center 140.

Otherwise, the manager module 410 may be configured to determine that the authorized user possesses a later version of the cryptographic key than the cryptographic key used to encrypt the selected file, in step 625. The manager module 410 may be configured to generate a previous version of the current cryptographic key that the authorized user holds in step 630. In particular, the manager module 410 may be configured to pass the current cryptographic key that the authorized user holds and an asymmetric public key of the file owner to the key generation module 420. The key generation module 420 may be configured to generate the previous version of the key based on the relationship of $K_i=E_{Pu}[K_{i+1}]$. The manager module 410 may be configured to update the metadata of the previous version of the cryptographic key and return to the processing of step 610.

Otherwise, in step 635, the manager module 410 may be configured to determine that the current version of the cryptographic key possessed by the authorized user matches the version of the cryptographic key used to encrypt the selected file. The manager module 410 may be further configured to pass the current cryptographic key and the selected file (or a pointer to the selected file) to the encryption/decryption module 430. The encryption/decryption module 430 may be configured to decrypt the selected file, in step 640. Subsequently, the manager module 410 may be configured to return to the idle state of step 605.

Figure 7:
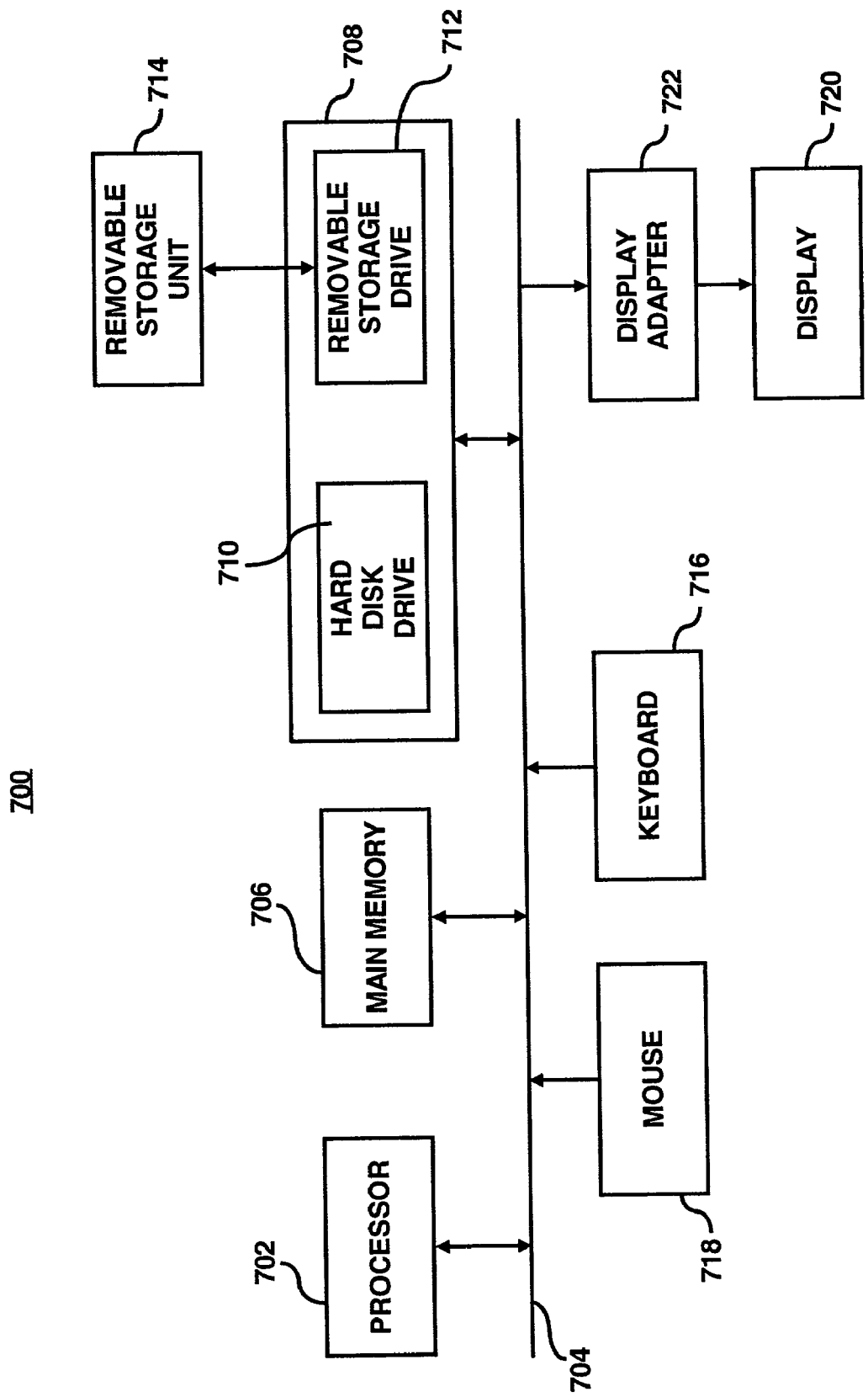
FIG. 7 illustrates an exemplary block diagram of a computer system where an embodiment of the present invention may be practiced.

FIG. 7 illustrates an exemplary block diagram of a computer platform 700 where an embodiment of the present invention may be practiced. As shown in FIG. 7, the computing platform 700 includes one or more processors, such as processor 702 that provides an execution platform for the security module 115. Commands and data from the processor 702 are communicated over a communication bus 704. The computing platform 700 also includes a main memory 706, preferably Random Access Memory (RAM), where the software for the security module 115 may be executed during runtime, and a secondary memory 708. The secondary memory 708 includes, for example, a hard disk drive 710 and/or a removable storage drive 712, representing a floppy diskette drive, a magnetic tape drive, a compact disk drive, etc., where a copy of software for the security module 115 may be stored. The removable storage drive 712 reads from and/or writes to a removable storage unit 714 in a well-known manner. A user interfaces with the security module 115 with a keyboard 716, a mouse 718, and a display 720. The display adaptor 722 interfaces with the communication bus 704 to receive display data from the processor 702 and converts the display data into display commands for the display 720.

Certain embodiments of the present invention may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

While the exemplary invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method of enabling lazy-revocation in a cryptographic file system, said method comprising:
revoking access of a user of a plurality of users to a file;
generating a new version of a key using a recursive key generation process by applying a private key to a current version of said key;
encrypting said file with said new version of said key in response to an update of said file; and
generating a previous version of said key based on said new version of said key to access a previous version of said file by applying a public key to said new version of said key.

2. The method according to claim 1, further comprising:
distributing said new version of said key to at least one authorized user in response to said update of said file.

3. The method according to claim 1, wherein said public key is part of an asymmetric public/private key pair of said file owner.

4. The method according to claim 1, wherein the private key is a private key of a file owner of said file.

5. The method according to claim 4, wherein said private key is part of an asymmetric public/private key pair of the said file owner.

6. The method according to claim 1, wherein said current version of said key is a symmetric key and said new version of said key is generated utilizing an asymmetric private/public key pair of said file owner.

7. The method according to claim 1, wherein said current version of said key is an asymmetric key and said new version of said key is generated utilizing an asymmetric private/public key pair of said file owner.

8. The method according to claim 7, wherein said asymmetric private/public key pair of said file owner is generated by an El Gamal asymmetric crypto-system.

9. A method of managing files in a file system, said method comprising:
revoking access of a user of a plurality of users to a file, wherein the file is a new version of the file and the access of the user is not revoked for previous versions of the same file;
generating a new key from a current key of said file in response to said revocation using a recursive key generation process by applying a private key to the current key; and
encrypting said file with said new key.

10. The method according to claim 9, wherein the private key is a private key of an owner of said file.

11. The method according to claim 9, further comprising:
accessing a previous version of said file; and
generating a respective previous version of the current key by applying a public key to said current key.

12. A method of accessing files, comprising:
determining a version of a first key used to encrypt a version of a file, wherein different versions of the file are encrypted with different versions of the first key used to encrypt the file and wherein the different versions of the first key are created using a recursive key generation process by applying a private key to the first key;

determining a version of a second key;

accessing said file in response to said version of said first key used to encrypt the file and said version of said second key matching; and generating a previous version of said second key by applying a public key of an owner of said version of the file to the second key in response to said version of said first key used to encrypt the file being older than said version of said second key.

13. The method according to claim 12, further comprising:

requesting access from an owner of said file in response to said version of said second key being older than said version of said first key.

14. The method according to claim 12, wherein the private key is a private key of said owner of said file.

15. The method according to claim 12, further comprising:

recursively generating another previous version of said second key from said second key until said version of said second key matches said version of said first key.

16. A method for accessing files, comprising:

determining a version of a first key used to encrypt a version of a file, wherein different versions of the file are encrypted with different versions of the first key used to encrypt the file and wherein the different versions of the first key are created using a recursive key generation process by applying a private key to the first key;

determining a version of a second key; and recursively generating a previous version of said second key by applying a public key of an owner of said version of the file to said second key until said version of said second key matches said version of said first key in response to said version of said first key used to encrypt the file being older than said version of said second key.

17. The method according to claim 16, wherein said generation of said previous version of said second key utilizes an asymmetric public key of said owner of said file.

18. A method of managing files in a file system, said method comprising:

revoking access of a user of a plurality of users to a file, wherein the file is a new version of the file and the access of the user is not revoked for previous versions of the same file;

generating a new key using a recursive key generation process by applying a private key to a current key of said file in response to said revocation; and encrypting said file with said new key.

19. The method according to claim 18, wherein said private key is a private key of an owner of said file.

20. The method according to claim 18, further comprising:

accessing a previous version of said file; and generating a respective previous version of a key from said current key by applying a public key to said current key.

21. The method according to claim 20, wherein generation of said respective previous version of said key utilizes an asymmetric public key of an owner of said file.

22. A system for managing files, comprising:

a file system configured to store files and provide access to said files;

a user station; and a security module configured to be executed on said user station, wherein said security module is configured to revoke access of a user of a plurality of users to a file wherein the file is a new version of the file and the access of the user is not revoked for previous versions of the same file, is also configured to generate a new key from a current key using a recursive key generation process by applying a private key to the current key of said file stored on said file system in response to said revocation, and is further configured to encrypt said file with said new key.

23. The system according to claim 22, wherein said security module is further configured to distribute said new version of said key to at least one authorized user in response to said update of said file.

24. The system according to claim 22, wherein said security module is further configured to generate a previous version of said key by applying a public key to said new version of said key to access a previous version of said file.

25. The system according to claim 24, wherein said security module is further configured to receive a asymmetric public key of a file owner of said file, wherein said generation comprises generating said previous version of said key utilizing said asymmetric public key of said file owner of said file.

26. The system according to claim 22, wherein said generation of said new version of said key utilizes an asymmetric private key of a file owner of said file.

27. A system for accessing files comprising:

a memory;

at least one processor; and a security module residing in said memory and executed by said at least one processor, wherein said security module is configured to determining a version of a first key used to encrypt a version of a file, wherein different versions of the file are encrypted with different versions of the first key and wherein different versions of the first key are created using a recursive key generation process by applying a private key to the first key, and wherein the security module is also configured to determine a version of a second key, and is further configured to access said file in response to said version of said first key used to encrypt the file and said version of said second key matching, and generate a previous version of said second key by applying a public key of an owner of said version of the file to the second key in response to said version of said first key used to encrypt the file being older than said version of said second key.

28. The system according to claim 27, wherein said security module is further configured to generate a previous version of said second key in response to said version of said file being older than said version of said second key.

29. The system according to claim 28, further comprising:

recursively generating another previous version of said second key from said first key until said version of said second key matches said version of said file.

30. A computer readable medium upon which is stored a computer program including instructions which when executed by a processor cause the processor to perform the instructions, comprising:

means for determining a version of a first key used to encrypt a version of a file, wherein different versions of the file are encrypted with different versions of the first key used to encrypt the file and wherein different versions of the first key are created using a recursive key generation process by applying a private key to the first key;

means for determining a version of a second key; and means for recursively generating a previous version of said second key by applying a public key to said second key until said version of said second key matches said version of said first key in response to said version of said first key used to encrypt the file being older than said version of said second key.

31. The computer readable medium according to claim 30, further comprising:

means for requesting access from an owner of said file in response to said version of said key being older than said version of said file.

32. The computer readable medium according to claim 30, wherein said generation of said previous version of said key utilizes an asymmetric public key of said owner of said file.

33. A computer readable medium upon which is stored a computer program including instructions which when executed by a processor cause the processor to perform the instructions, comprising:

means for revoking access of a user of a plurality of users to a file, wherein the file is a new version of the file and the access of the user is not revoked for previous versions of the same file;

means for generating a new key from a current key of said file in response to said revocation wherein the new key is created using a recursive key generation process by applying a private key to the current key; and means for encrypting said file with said new key.

34. The computer readable medium according to claim 33, wherein said private key is an asymmetric private key of an owner of said file.

35. The computer readable medium according to claim 33, further comprising:

means for accessing a previous version of said file; and means for generating a respective previous version of a key from said current key by applying a public key to the current key.

36. The computer readable medium according to claim 35, wherein said public key is an asymmetric public key of an owner of said file.

* * * * *